Oct. 16, 1945.  S. E. HILBLOM  2,387,070
MOWER
Filed Sept. 23, 1943  2 Sheets-Sheet 1
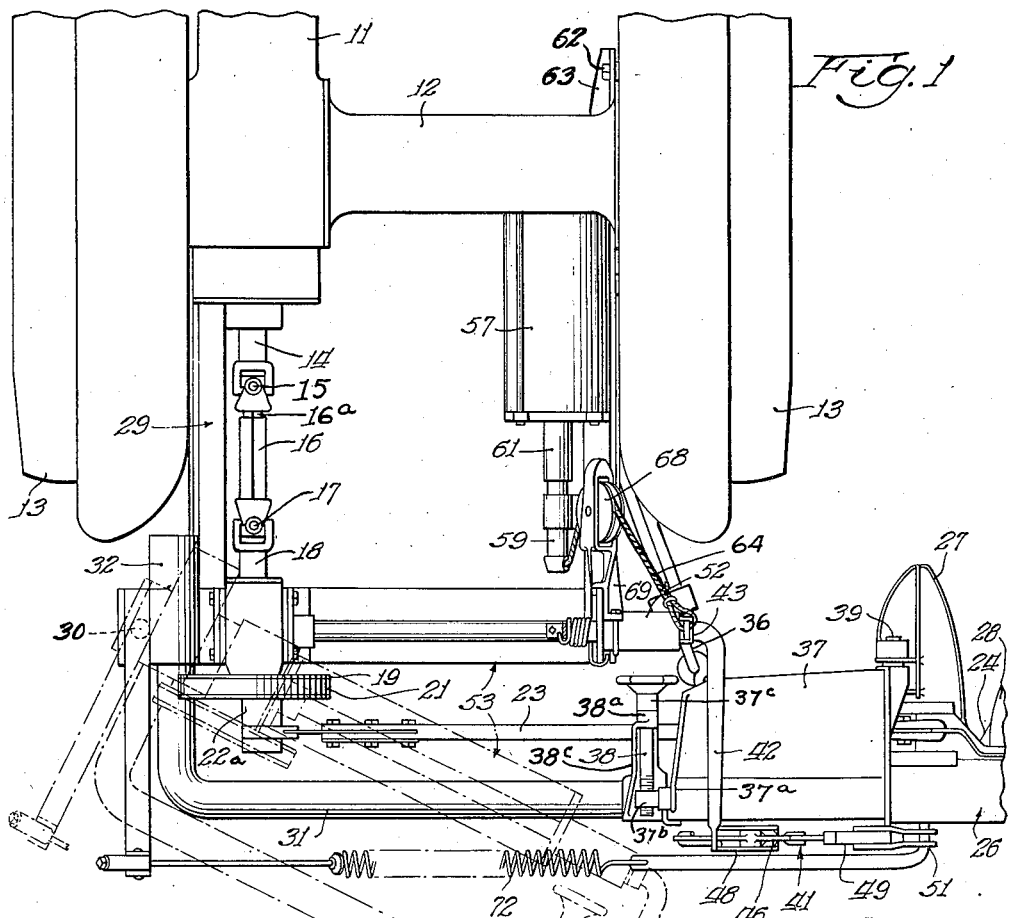
Fig. 1
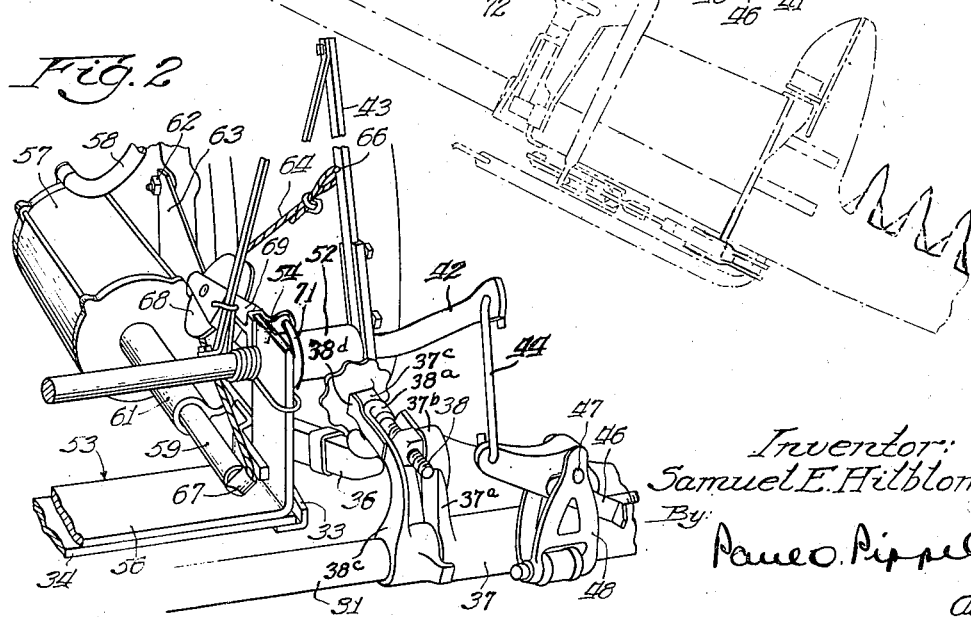
Fig. 2
Inventor:
Samuel E. Hilblom
By
Atty.

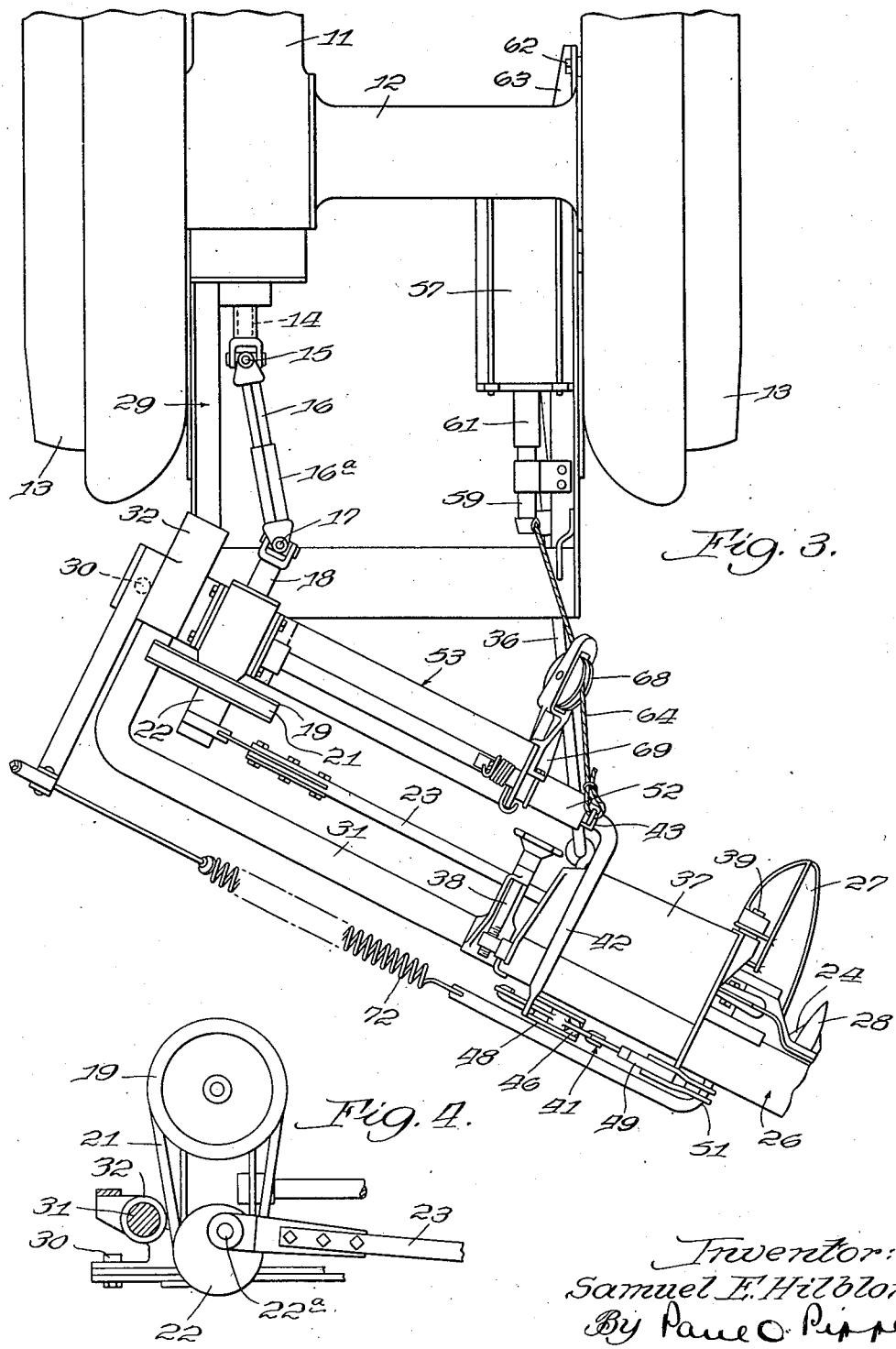

Patented Oct. 16, 1945

2,387,070

UNITED STATES PATENT OFFICE 2,387,070

MOWER

Samuel E. Hilblom, Chicago, Ill., assignor to International Harvester Company, a corporation of New Jersey Application September 23, 1943, Serial No. 503,474

3 Claims. (Cl. 56—25)

This invention relates to a new and improved mower and has for one of its principal objects the provision of means for permitting rearward swinging of the mower in combination with an upward swinging of the mower.

More particularly the present invention relates to a means for permitting rearward swinging of the mower without in any way affecting the control apparatus for raising of the mower.

Prior mowers capable of two ranges of movement were confronted with the difficulty of maintaining engagement of the control mechanism for one range of movement during operation of the other range of movement. Complex interlocks were designed to overcome this problem and in view of their complexity, necessitated by the requirement that they permit disengagement and compel reengagement, their use was prohibitive. It is, therefore, an important object of this invention to eliminate an intricate interlocking mechanism, and instead of replacing the interlock, means are provided in the control mechanism that permit swinging of the mower through one range without any disengagement of the other operating mechanism.

A still further important object of this invention is to provide a rear mounted tractor mower capable of swinging rearwardly without any disengagement of control means for upward lifting of the mower, and upon such rearward swinging, the mower will have no tendency to swing upwardly.

Other and further important objects of the present invention will become apparent from the disclosure in the following specification and accompanying drawings, in which:

Figure 1 is a partial top plan view of a rear mounted tractor mower; and

Figure 2 is a perspective view of the mower lifting mechanism of the device as shown in Figure 1.

Figure 3 is another top plan view of the tractor mounted mower showing the mower swung rearwardly.

Figure 4 is a partial end view detail of the mower driving device as shown in Figure 1.

As shown in the drawings, the reference numeral 11 indicates generally a chassis of an agricultural tractor having rear axle housings 12 with traction wheels 13 at the outer ends thereof. The tractor is equipped with a power take-off shaft 14 and in this case supplies the power for the mower. The power take-off shaft 14 forms a part of a knuckle or universal joint 15. A square shaft 16 includes a complementary portion of the joint 15 and at its opposite end slidably telescopes the sleeve 16$^a$ which forms part of a second universal joint 17. The other side of the joint 17 comprises a shaft 18, which drives a pulley 19 having a V-belt or the like 21, which imparts rotation to the pulley 22 on which is mounted a crank 22$^a$. Similar mower drives are shown in my prior patents, 2,314,215 and 2,314,216. A pitman 23 interconnects the crank 22$^a$ and a sickle 24 of a cutter bar 26. The cutter bar 26 comprises a ground shoe or the like 27, a sickle guard 28, and the reciprocating sickle 24.

The tractor is equipped with a draw bar structure 29, upon which is mounted a supporting arm 31 for the mower cutter bar 26. The arm 31 is L-shaped and is equipped for vertical hinged movement at a horizontal sleeve pivot connection 32 with the draw bar 29 of the tractor. A vertical pivot is provided at 30 about which the mower may swing rearwardly as shown in dashed lines in Figure 1. This arrangement of horizontal and vertical pivots is shown in greater detail in Patent No. 2,052,294. As best shown in Figure 2, the draw bar structure 29 consists of side angle bars 33 and a cross-connecting plate 34 welded or otherwise attached to the angle bars 33. The mower is normally maintained in the position shown in full lines in Figure 1, but upon the cutter bar 26 striking an obstruction and putting excessive pressure thereon, releasable means is available in the form of a telescoping release 36. This telescoping release 36 is employed on numerous tractor mowers of this and other types and operates on an excessive load principle. Details of this release are shown in Patent 2,314,216. The mower is shown in rearward position in Figure 3 and in this position the telescoping release member 36 is fully extended and prevents complete rearward swinging by conventional limit means. The cutter bar 26 is connected to a yoke 37 and with said yoke is manually tiltable about the supporting coupling arm 31 by means of an adjusting screw 38. The yoke 37 is journally rotatable on the end of the supporting arm 31. An upright arm or bracket 37$a$ is fixed to the end of the yoke 37 and carries on its upper end, by a swivel connection (not shown), an internally threaded block 37$b$. The adjusting screw 38 threadedly engages the block 37$b$ and is rotatably supported in collar 38$a$ formed in the upper end of a bracket 38$c$ fastened rigidly to the supporting arm 31. As the screw 38 is rotated, the bracket 37$a$ on the yoke 37 moves with respect to the bracket 38$c$ and hence causes tilting of the cutter-bar around the rigid supporting arm 31. A spring locking plate 38$d$ is attached to the bracket 38$c$ and engages a square shank portion 37c of the adjustable screw 38 to prevent undesired movement of the screw.

The mower cutter bar 26 is hinged for vertical swinging movement about a pivot axis 39. Suitable linkage 41 is supplied intermediate the cutter bar 26 and a lever arm 42. As best shown in Figure 2, the lever arm 42 is equipped with an upright arm member 43, and upon movement of the arm 43 forwardly, the arm 42 is raised upwardly effecting operation of the linkage 41. The linkage 41 includes a link 44 and lever 46. As the link 44 is raised the right end of a lever 46 is simultaneously lowered about its pivotal mounting at 47 on the bracket 48 fastened to the yoke or sleeve member 37 as shown in Figure 2. The lever 46 is engaged with a second pivoted lever 49 of the linkage 41 which is connected at 51 to the cutter bar 26. The lever 49 in operation is adapted to move upwardly, whereupon the mower will swing upwardly about its hinge axis 39.

The lever arm 42 is journally mounted on a supporting sleeve 52, which is in turn supported on the angle bracket 53 having an upward extension 54. The lower portion 56 of the bracket 53 rests on the draw bar plate 34 when the mower is in normal operating position. However, when the mower releases for rearward movement, the bracket 53 slides off the support 34, and it is evident therefore that the levers 43 and 42 move with the entire mower and frame structure. Heretofore, the arm 43 has been actuated by a hand lever extending upwardly therefrom in proximity to the tractor operator's station, but it is the purpose of the present invention to provide lifting means or lever shifting means which may be operated by a tractor operated power cylinder 57. This power cylinder 57 comprises a piston (not shown) shiftable by means of a fluid such as oil or exhaust gases through the conduit 58. The piston is supplied with a piston rod 59, which is slidably journaled in the sleeve-like extension 61 of the cylinder 57. The cylinder 57 is mounted rigidly with the tractor frame at 62 by means of a bracket 63 and preferably under the axle housing 12.

Control means is provided for the operation of the power cylinder 57 at some point adjacent the operator's station, which controls the admission and cessation of flow of fluid to the power cylinder 57. A cable 64 is attached to the upright lever 43 at 66, and at its opposite end is attached to the end of the piston rod 67. The cable 64 extends around a pulley or sheave 68, which is rotatably mounted on a bracket 69 affixed to the vertical plate member 54 and the shaft 52 by means of a clamp or the like 71. It is apparent that an extension of the piston rod 59 will cause a forward movement of the lever 43 similar to manual movement of the same lever. The placing of the pulley 68 forwardly of the end of the piston rod 59 is essential in the operation of the present device.

Frequently in mowers of this type having two ranges of movement and one being operated by a cable or the like, a shifting of the mower through one of its ranges of movement would cause a simultaneous partial shifting of the mower through its other range of movement, for the reason that the cable would be extended and the movement of the mower through one range would act similar to an operation of the cable-operated lever. However, the critical positioning of this pulley 68 at a point forward of the end of the thrust-operating piston rod 59 permits rearward swinging of the mower to its dotted position shown in Figure 1 and as completely shown in Figure 3 without causing excess tension in the cable 64, which would result in a lifting of the mower about its axis 39. When the mower is in its operating position, a thrust extension of the piston rod 59 causes a tensioning of the cable 64, which exerts a forward pull on the lever 43, which, as previously stated, effects movement of the levers 42, 44, and 41, which cause a lifting of the cutter bar about its hinge 39. When the mower is swung to its rearward position as shown in Figure 3, the cutter bar 26 and entire frame, including the arm 31 and the angle bracket 53 are separated from the tractor. The pulley 68 forms a part of the mower frame and extends forwardly thereof so that when the mower is in operative position as shown in Figure 1 the pulley is positioned forwardly of the end of the piston rod 59 which forms a part of the tractor. In its rearward position the pulley 68 lies between the tractor and the mower, and the cable 64 is extended in a substantially straight line. But for the forward positioning of the pulley 68, the cable 64 would be far too short to permit the rearward swinging of the mower without pulling down on the lever 43. Hence, it will be realized that the mower may swing rearwardly without lifting the cutter bar 26.

A spring 72 is attached intermediate the cutter bar and frame of the mower to assist the cutter bar 26 in its process of being raised about its hinge 39 when actuated by the power cylinder 57.

Obviously, if the pulley 68 were not employed, any rearward yielding or swinging of the mower about its hinge 30 would cause a tightening of the cable 64 with the result that the lever 43 would be actuated. It is undesirable that the mower be lifted vertically when it is swung rearwardly, and to that end the pulley 68 obviates such difficulty.

It is possible, of course, that other construction changes may be made which will not depart from the principles disclosed herein, and I therefore do not propose limiting the patent granted hereon otherwise than as necessitated by the appended claims.

What is claimed is:

1. A rear mounted tractor mower capable of horizontal and vertical movement with respect to the tractor, a power-operated arm on said tractor, a pulley on and movable with said mower and extending forwardly beyond the end of said power-operated arm, a cable extending around the pulley and between the power-operated arm and the mower whereby movement of said power-operated arm causes a lifting of the mower through its vertical range of movement, and releasable means associated intermediate the mower and the tractor whereby upon rearward swinging of the mower with respect to the tractor the pulley swings into position between the tractor and mower thus maintaining a continuous slack in the cable for rearward swinging of the mower.

2. In combination, a tractor having a power take-off, a fluid-operated power cylinder, a thrust type piston arm operated by said power cylinder, a rear mounted implement having a frame part and a mower part, the frame part hinged on the tractor for horizontal swinging movement thereof, a pulley on and movable with said frame part and projecting forwardly of the thrust arm on the tractor, when the frame and mower parts are in operative position, said mower part having a cutter bar, driving means interconnecting the power take-off of the tractor and the cutter bar of the mower, said mower part hinged to the frame part for vertical swinging movement thereof, lever means interconnected between the frame part and mower part, and cable means joining said thrust arm and said lever and extending around said pulley whereby an extension of said thrust arm causes the mower part to swing upwardly through its vertical range and whereby the critical positioning of the pulley allows rearward swinging of said frame part with a constantly slack cable means.

3. In combination, a tractor having a rearwardly extending transverse drawbar, an implement frame part hinged to one side of said drawbar for horizontal swinging movement and extending laterally across the rear of the tractor, an implement operating part projecting laterally beyond the tractor at the side opposite the hinging of the implement frame part, said implement operating part hinged to said implement frame part for vertical swinging movement, a power cylinder for effecting vertical swinging movement mounted adjacent said drawbar at the side opposite said implement frame part hinge, said power cylinder having a controlled reciprocating arm extending rearwardly therefrom, a pulley on said implement frame part projecting forwardly beyond the end of said reciprocating arm when the implement frame part is in normal operating position, a cable extending from the vertical swinging implement operating part around said pulley to said reciprocating arm, and said pulley positioned rearwardly of said reciprocating arm when the implement frame part is swung rearwardly through its horizontal swinging movement, whereby slack is maintained in said cable to compensate for the distance between the horizontal swinging hinge and the operating position of the pulley.

SAMUEL E. HILBLOM.